United States Patent

Jin

(10) Patent No.: US 9,254,826 B2
(45) Date of Patent: Feb. 9, 2016

(54) PURGE CONTROL METHOD OF AIR TANK

(71) Applicant: Hyundai Motor Company, Seoul (KR)

(72) Inventor: Jung Hoon Jin, Namyangju-si (KR)

(73) Assignee: Hyundai Motor Company, Seoul (KR)

( * ) Notice: Subject to any disclaimer, the term of this patent is extended or adjusted under 35 U.S.C. 154(b) by 657 days.

(21) Appl. No.: 13/711,439

(22) Filed: Dec. 11, 2012

(65) Prior Publication Data

US 2014/0116400 A1    May 1, 2014

(30) Foreign Application Priority Data

Oct. 26, 2012   (KR) .................. 10-2012-0119619

(51) Int. Cl.
*B01D 53/26*   (2006.01)
*B60T 13/26*   (2006.01)
*B60T 17/00*   (2006.01)

(52) U.S. Cl.
CPC .............. *B60T 13/26* (2013.01); *B60T 17/004* (2013.01); *B01D 53/261* (2013.01)

(58) Field of Classification Search
CPC .. B01D 53/26; B01D 53/261; B01D 53/0454; B01D 46/003; F04B 39/16; B60T 17/00; B60T 17/004; B60T 13/26; B60T 13/268
USPC ........ 55/DIG. 17; 95/8, 10, 19, 21; 137/7, 12, 137/14
See application file for complete search history.

(56) References Cited

U.S. PATENT DOCUMENTS

| | | | | |
|---|---|---|---|---|
| 5,103,576 | A * | 4/1992 | Cramer | B60T 17/004 34/549 |
| 5,632,802 | A * | 5/1997 | Grgich | B01D 53/0431 95/10 |
| 7,279,026 | B1 * | 10/2007 | Fresch | B01D 53/04 95/124 |
| 7,608,132 | B2 * | 10/2009 | Fornof | B60T 17/004 34/79 |
| 2011/0278804 | A1 | 11/2011 | Folchert et al. | |

FOREIGN PATENT DOCUMENTS

| | | |
|---|---|---|
| EP | 0523194 A1 | 1/1993 |
| JP | 2010 221110 A | 10/2010 |
| JP | 2010 221179 A | 10/2010 |
| JP | 2010 229897 A | 10/2010 |
| JP | 2011 122595 A | 6/2011 |
| KR | 1020110123752 A | 11/2011 |
| WO | WO 94/07726 A1 | 4/1994 |
| WO | WO 2007/142008 A1 | 12/2007 |

* cited by examiner

*Primary Examiner* — Craig Schneider
*Assistant Examiner* — Ian Paquette
(74) *Attorney, Agent, or Firm* — Morgan, Lewis & Bockius LLP

(57) ABSTRACT

A purge control method of an air tank may include compressing air in an air compressor, removing moisture from the air through a cartridge, storing the air in the air tank, measuring and determining an internal pressure of the air tank after storing the air in the air tank, operating a first solenoid valve if the internal pressure exceeds a first predetermined pressure, determining whether a second solenoid valve is operable and operating the second solenoid valve if operable, operating a purge valve to improve performance of the cartridge, thereby removing the moisture in the air tank, measuring and determining the internal pressure again, and turning off the first and second solenoid valves if the internal pressure is less than a second predetermined pressure.

5 Claims, 3 Drawing Sheets

PURGE CONTROL METHOD OF AIR TANK

CROSS-REFERENCE TO RELATED APPLICATION

The present application claims priority of Korean Patent Application Number 10-2012-0119619, filed on Oct. 26, 2012, the entire contents of which application is incorporated herein for all purposes by this reference.

BACKGROUND OF INVENTION

1. Field of Invention

The present invention relates to a purge control method of an air tank, and more particularly, to a purge control method of an air tank for optimizing the number of purges and detecting a time when performance of a cartridge is deteriorated.

2. Description of Related Art

In general, when air including moisture is supplied to an apparatus using air pressure such as an air pressure brake, an air suspension, a sheet, an air conditioner, or the like, of a vehicle such as a large truck, a bus, or the like, an abnormal operation may be caused.

For example, when the air including the moisture is supplied to the air pressure brake, a decrease in a braking torque, eccentric braking at the left and the right, or the like, may be caused.

Meanwhile, an air tank according to the related art includes an air pressure control unit (APU) 10 as shown in FIG. 1. The APU 10 includes a cartridge to allow air that does not include moisture to be provided to an apparatus using air pressure such as an air pressure brake, an air suspension, a sheet, an air conditioner, or the like, of a vehicle such as a large truck, a bus, or the like.

Here, at the time of designing the APU 10, it has been required that a temperature at an inlet side of the APU 10 connected to an air compressor is 75° C. or less, a temperature at an outlet side thereof is 30° C. or less, and an internal temperature thereof is 65° C. or less.

However, in the air tank according to the related art, since the number of purges for regenerating the cartridge of the APU is excessive, fuel efficiency is deteriorated, and a lifespan of the cartridge is deteriorated, such that marketability is decreased.

Given the above background, there is a need to solve at least some or all of the above-mentioned problems occurring in the prior art while advantages achieved by the prior art are maintained intact.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a purge control method of an air tank for optimizing the number of purges of an air tank and detecting a time when performance of a cartridge is deteriorated.

Various aspects of the present invention provide a purge control method of an air tank including compressing air in an air compressor, removing moisture from the air through a cartridge after the compressing the air, storing the air, subsequently to the removing the moisture, in the air tank, measuring and determining an internal pressure of the air tank after the storing the air in the air tank, operating a first solenoid valve if the internal pressure of the air tank exceeds a first predetermined pressure, determining whether or not a second solenoid valve is operable after the operating the first solenoid valve, operating the second solenoid valve if the second solenoid valve is operable, operating a purge valve, concurrently with or subsequently to the operating the second solenoid valve, to improve performance of the cartridge, thereby removing the moisture in the air tank, measuring and determining the internal pressure of the air tank after the operating the purge valve, and turning off the first and second solenoid valves if the internal pressure of the air tank measured and determined after the operating the purge valve is less than a second predetermined pressure.

An air pressure control unit (APU) may be operated at the time of operating the firs and second solenoid valves.

The storing the air in the air tank may include measuring internal temperature and humidity of the air tank by a thermo-hygrometer provided in the air tank, measuring dew point temperature of the air tank by the thermo-hygrometer interworking with an electronic control unit (ECU), measuring or determining whether or not a difference between the internal temperature and the dew point temperature of the air tank is lower than a predetermined temperature difference, and operating the second solenoid valve if the difference between the internal temperature and the dew point temperature of the air tank is lower than the predetermined temperature difference.

The first predetermined pressure may be set to approximately 11.5 bar, and the second predetermined pressure may be set to approximately 10.8 bar. The predetermined temperature difference may be set to approximately 15° C.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
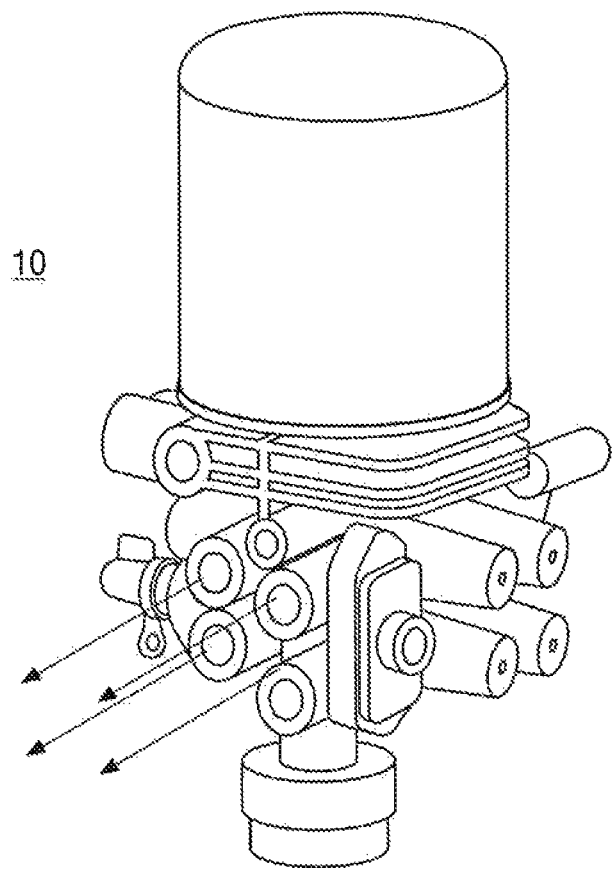
FIG. 1 is a diagram showing an air pressure control unit (APU) of an air tank according to the related art.
Figure 2:
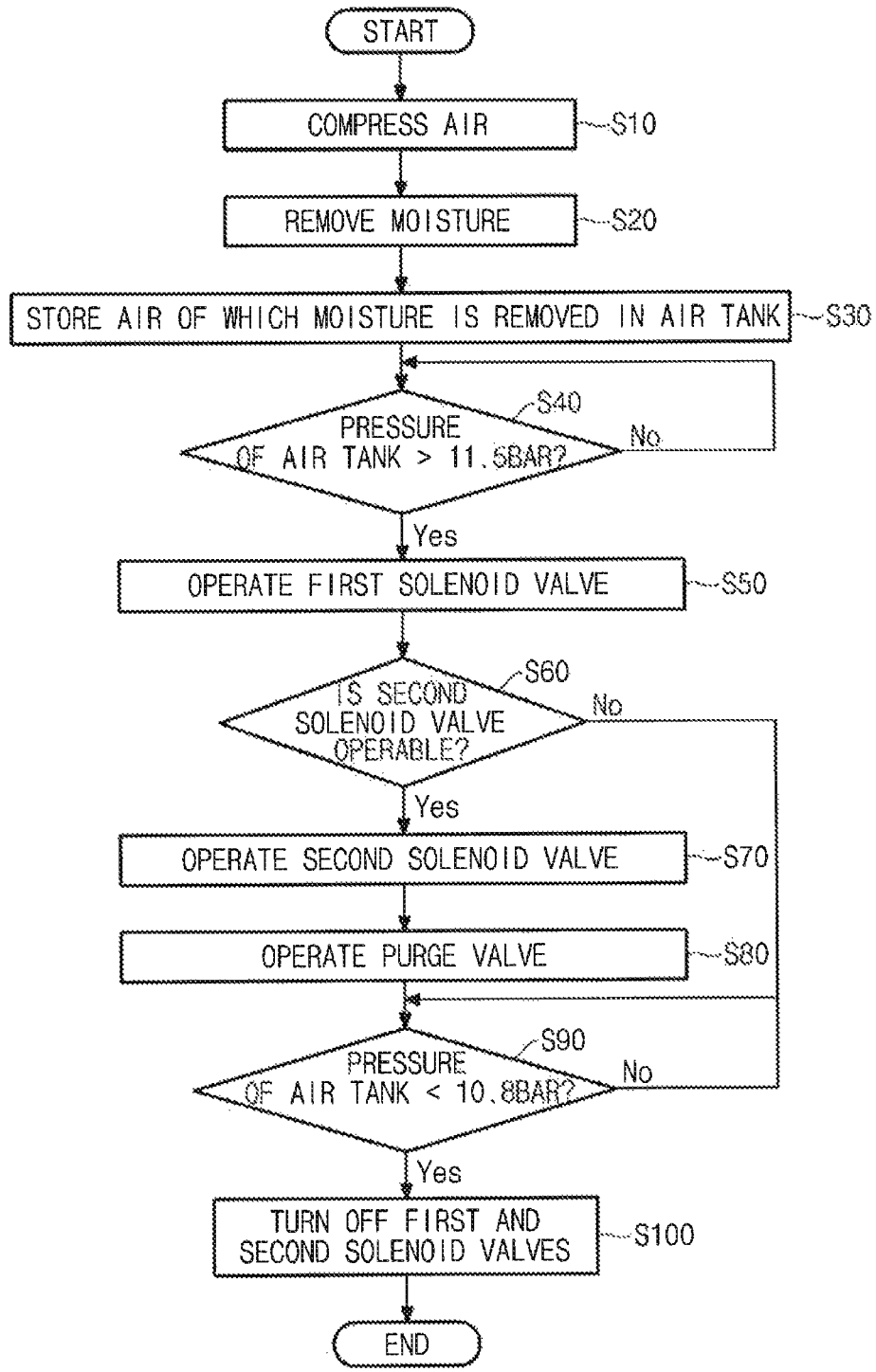
FIG. 2 is a flow chart showing an exemplary purge control method of an air tank according to the present invention.
Figure 3:
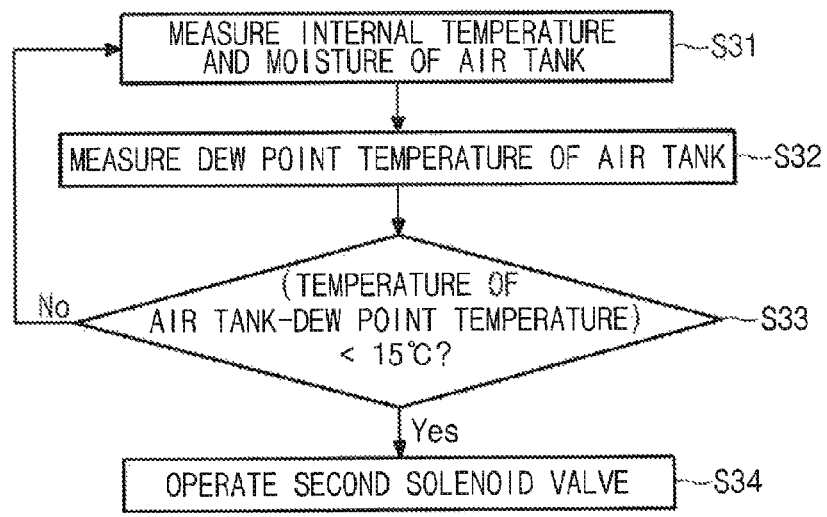
FIG. 3 is a flow chart showing steps 3-1 to 3-4 of the above purge control method of an air tank according to the present invention.
Figure 4:
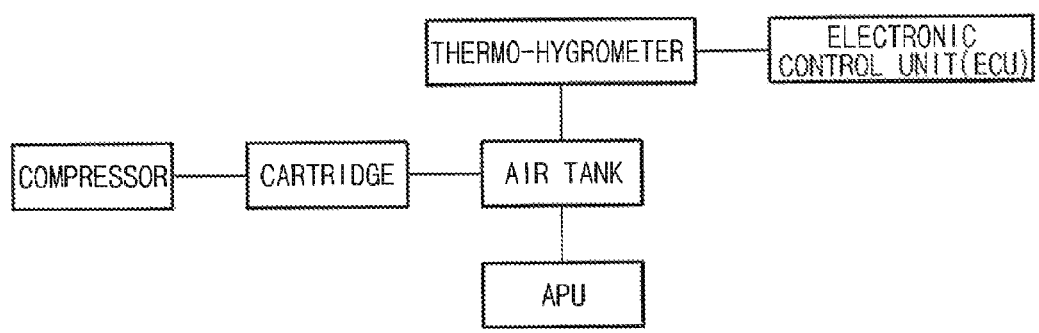
FIG. 4 is a configuration diagram showing the above purge control method of an air tank according to the present invention.

As shown in FIGS. 2 to 4, a purge control method of an air tank according to various embodiments of the present invention may include a first step (S10) of compressing air in an air compressor, a second step (S20) of removing moisture through a cartridge, a third step (S30) of storing air, a fourth step (S40) of measuring and determining pressure of the air tank, a fifth step (S50) of operating a first solenoid valve, a sixth step (S60) of determining whether or not a second solenoid valve is operable, a seventh step (S70) of operating the second solenoid valve, an eighth step (S80) of operating a purge valve, a ninth step (S90) of again measuring and determining pressure of the air tank, and a tenth step (S100) of turning off the first and second solenoid valves.

As shown in FIG. 2, the first step (S10) is a step of compressing the air through the compressor. The second step (S20) is a step of removing the moisture of the air compressed through the cartridge after the air is compressed in the first step (S10). The third step (S30) is a step of storing the air of which the moisture is removed in the second step (S20) in the air tank.

Here, an inner portion of the air tank is mounted with a thermo-hygrometer that measures temperature and humidity, to be described below, such that internal temperature and humidity of the air tank may be measured.

The fourth step (S40), which is a step of measuring and determining internal pressure of the air tank in which the air is stored in the third step (S30), proceeds to the fifth step (S50) if the measured internal pressure of the air tank exceeds a predetermined pressure or measures again the internal pressure of the air tank if the measured internal pressure of the air tank is the predetermined pressure or less. The predetermined pressure in the air tank may be set, for example, to approximately 11.5 bar.

The fifth step (S50) is a step of operating the first solenoid valve if determined in the fourth step (S40) the internal pressure of the air tank exceeds the predetermined pressure, for example, 11.5 bar.

The sixth step (S60), which is a step of determining whether or not the second solenoid valve is operable after the fifth step (S50), proceeds to the seventh step (S70) if the second solenoid valve is operable or proceeds to a ninth step (S90), to be described below, if the second solenoid valve is not operable.

The seventh step (S70) is a step of operating the second solenoid valve if the second solenoid valve determined in the sixth step (S60) is operable. Meanwhile, in the fifth and seventh steps (S50 and S70), an air pressure control unit (APU) may be operated at the time of operating the first and second solenoid valves to allow a purge valve, to be described below, to be operated.

The eighth step (S80) is a step of operating the purge valve concurrently with or subsequently to operating the second solenoid valve in the seventh step (S70) to discharge the air to the atmosphere and improve performance of the cartridge, thereby enabling removal of the moisture in the air tank.

The ninth step (S90), which is a step of measuring and determining internal pressure of the air tank after removing the moisture in the air tank in the eighth step (S80), proceeds to the tenth step (S100) if the measured internal pressure is lower than a predetermined pressure, or measures again the internal pressure of the air tank if the measured internal pressure is the predetermined pressure or more. The predetermined pressure in the air tank for this step may be set, for example, to approximately 10.8 bar.

The tenth step (S100) is a step of turning off the first and second solenoid valves if determined in the ninth step (S90) the internal pressure of the air tank is less than the predetermined pressure, for example, 10.8 bar.

Meanwhile, as shown in FIG. 3, the third step (S30) of storing the air of which the moisture is removed includes a 3-1 step (S31) of measuring temperature and humidity, a 3-2 step (S32) of measuring dew point temperature, a 3-3 step (S33) of measuring and determining a temperature difference, and a 3-4 step (S34) of operating the second solenoid valve.

The 3-1 step (S31) is a step of allowing a thermo-hygrometer to be provided in the air tank to measure internal temperature and humidity of the air tank. The 3-2 step (S32) is a step of allowing the thermo-hygrometer in the air tank to interwork with an electronic control unit (ECU) to measure dew point temperature of the air tank through the electronic control unit.

The 3-3 step (S33) measures or calculates a difference between the internal temperature and the dew point temperature of the air tank, and determines whether or not the difference between the internal temperature and the dew point temperature of the air tank is lower than a predetermined temperature difference, for example, approximately 15° C. The 3-3 step (S33) proceeds to the next step when the difference is lower than the predetermined temperature difference, for example, 15° C. or proceeds to the 3-1 step (S31) when the difference is higher than the predetermined temperature difference, for example, 15° C., thereby measuring again the temperature and humidity.

The 3-4 step (S34) is a step of operating the second solenoid valve if the difference between the internal temperature and the dew point temperature of the air tank is lower than the predetermined temperature difference, for example, 15° C. determined in the 3-3 step (S33).

FIG. 4 is a configuration diagram showing the purge control method of an air tank according to various embodiments of the present invention. In this configuration, a compressor and an air heater are connected to an APU, the APU is connected to an air tank including a thermo-hygrometer, and the thermo-hygrometer interworks with an electronic control unit (ECU) to calculate dew point temperature through data on temperature and humidity of the air tank and operate the second solenoid valve if a temperature obtained by subtracting the dew point temperature of the air tank from the internal temperature of the air tank is lower than the predetermined temperature difference, for example, 15° C., thereby allowing a purge operation of the air tank to start.

As described above, according to various embodiments of the present invention, the purge operation of the air tank is controlled to decrease the number of purge operations and the number of cartridge operations, thereby making it possible to increase durability, allow a replacement lifespan of the cartridge to be expected, and improve fuel efficiency.

As set forth above, according to various embodiments of the present invention, the number of purge operations of the air tank is decreased to improve the fuel efficiency, and the number of cartridge operations is also decreased to increase the durability and allow the replacement lifespan of the cartridge to be expected, thereby making it possible to improve marketability.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A purge control method of an air tank, comprising:
    compressing air in an air compressor;
    removing moisture from the air through a cartridge after the compressing the air;
    storing the air, subsequently to the removing the moisture, in the air tank;
    measuring and determining an internal pressure of the air tank after the storing the air in the air tank;
    operating a first solenoid valve if the internal pressure of the air tank exceeds a first predetermined pressure;
    determining whether or not a second solenoid valve is operable after the operating the first solenoid valve;
    operating the second solenoid valve if the second solenoid valve is operable;
    operating a purge valve, concurrently with or subsequently to the operating the second solenoid valve, to improve performance of the cartridge, thereby removing the moisture in the air tank;
    measuring and determining the internal pressure of the air tank after the operating the purge valve; and
    turning off the first and second solenoid valves if the internal pressure of the air tank measured and determined after the operating the purge valve is less than a second predetermined pressure.

2. The purge control method of an air tank according to claim 1, wherein an air pressure control unit (APU) is operated at time of operating the first or second solenoid valve.

3. The purge control method of an air tank according to claim 1, wherein the first predetermined pressure is set to approximately 11.5 bar, and the second predetermined pressure is set to approximately 10.8 bar.

4. The purge control method of an air tank according to claim 1, wherein the storing the air in the air tank includes:
    measuring internal temperature and humidity of the air tank by a thermo-hygrometer provided in the air tank;
    measuring dew point temperature of the air tank by the thermo-hygrometer interworking with an electronic control unit (ECU);
    measuring or determining whether or not a difference between the internal temperature and the dew point temperature of the air tank is lower than a predetermined temperature difference; and
    operating the second solenoid valve if the difference between the internal temperature and the dew point temperature of the air tank is lower than the predetermined temperature difference.

5. The purge control method of an air tank according to claim 4, wherein the predetermined temperature difference is set to approximately 15° C.

* * * * *